(12) United States Patent
Howes

(10) Patent No.: US 9,720,691 B2
(45) Date of Patent: Aug. 1, 2017

(54) SPECULATIVE SCALARIZATION IN VECTOR PROCESSING

(71) Applicant: QUALCOMM Incorporated, San Diego, CA (US)

(72) Inventor: Lee Howes, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/863,030

(22) Filed: Sep. 23, 2015

(65) Prior Publication Data

US 2017/0083323 A1 Mar. 23, 2017

(51) Int. Cl.
| | |
|---|---|
| *G06F 9/45* | (2006.01) |
| *G06F 9/30* | (2006.01) |
| *G06F 9/38* | (2006.01) |
| *G06F 15/80* | (2006.01) |
| *G06F 9/455* | (2006.01) |

(52) U.S. Cl.
CPC ........ *G06F 9/30036* (2013.01); *G06F 8/4432* (2013.01); *G06F 9/30145* (2013.01); *G06F 9/3867* (2013.01); *G06F 9/45525* (2013.01); *G06F 15/8007* (2013.01); *G06F 15/8053* (2013.01)

(58) Field of Classification Search
CPC .......... G06F 9/455–9/45558; G06F 8/30–8/78
See application file for complete search history.

(56) References Cited

U.S. PATENT DOCUMENTS

| | | | |
|---|---|---|---|
| 8,458,680 B2* | 6/2013 | Crutchfield | G06F 8/443 |
| | | | 717/136 |
| 8,505,002 B2 | 8/2013 | Yehia et al. | |
| 8,627,043 B2 | 1/2014 | Eichenberger et al. | |
| 8,683,185 B2 | 3/2014 | Flachs et al. | |
| 9,047,077 B2* | 6/2015 | Schmidt | G06F 8/443 |
| 9,235,393 B2* | 1/2016 | Moritz | G06F 8/4432 |

(Continued)

OTHER PUBLICATIONS

Roth, Gerald, "Advanced Scalarization of Array Syntax," 2000, pp. 219-231.*

(Continued)

*Primary Examiner* — Thuy Dao
*Assistant Examiner* — Christopher Franco
(74) *Attorney, Agent, or Firm* — Shumaker & Sieffert, P.A.

(57) ABSTRACT

In an example, a method for speculative scalarization may include receiving, by a first processor, vector code. The method may include determining, during compilation of the vector code, whether at least one instruction of the plurality of instructions is a speculatively uniform instruction. The method may include generating, during complication of the vector code, uniformity detection code for the at least one speculatively uniform instruction. The uniformity detection code, when executed, may be configured to determine whether the at least one speculatively uniform instruction is uniform during runtime. The method may include generating, during complication of the vector code, scalar code by scalarizing the at least one speculatively uniform instruction. The scalar code may be configured to be compiled for execution by the first processor, a scalar processor, a scalar processing unit of the vector processor, or a vector pipeline of the vector processor.

27 Claims, 12 Drawing Sheets

(56) References Cited

U.S. PATENT DOCUMENTS

| | | | | |
|---|---|---|---|---|
| 9,274,799 B1* | 3/2016 | Winkel | G06F 9/30145 | |
| 2009/0276766 A1 | 11/2009 | Song et al. | | |
| 2011/0047359 A1* | 2/2011 | Eichenberger | G06F 8/451 | 717/145 |
| 2012/0079469 A1* | 3/2012 | Gonion | G06F 8/456 | 717/160 |
| 2012/0117552 A1* | 5/2012 | Krishnaiyer | G06F 8/4441 | 717/160 |
| 2012/0180030 A1* | 7/2012 | Crutchfield | G06F 8/443 | 717/149 |
| 2013/0232322 A1 | 9/2013 | Fetterman et al. | | |
| 2014/0237460 A1* | 8/2014 | Schmidt | G06F 8/443 | 717/160 |
| 2014/0244968 A1 | 8/2014 | Greyzck et al. | | |
| 2014/0331030 A1* | 11/2014 | Moritz | G06F 8/4432 | 712/220 |
| 2015/0026444 A1* | 1/2015 | Anderson | G06F 8/30 | 712/234 |

OTHER PUBLICATIONS

Shei, Chun-Yu et al., "MATLAB Parallelization through Scalarization," 2011, pp. 44-53.*

Rohou, Erven et al., "Speculatively Vectorized Bytecode," 2011, pp. 35-44.*

Zhao, Yuan et al., "Scalarization on Short Vector Machines," 2005, pp. 1-111.*

Hampton, Mark et al., "Compiling for Vector-Thread Architectures," 2008, pp. 205-215.*

Barik, Rajkishore et al., "Automatic Vector Instruction Selection for Dynamic Compilation," 2010, pp. 573-574.*

Collange et al., "Dynamic Detection of Uniform and Affine Vectors in GPGPU Computations," Aug. 25, 2009, EURO-PAR 2009 Parallel Processing Workshops : HPPC, Heteropar, Proper, Roia, Unicore, Vhpc, Delft, The Netherlands, Aug. 25-28, 2009 Workshops, Springer, Berlin, DE, pp. 46-55, XP019146138, ISBN: 978-3-642-14121-8.

International Search Report and Written Opinion for International Application No. PCT/US2016/049262, dated Nov. 21, 2016, 16 pp.

Karrenberg et al., "Improving Performance of OpenCL on CPUs," Mar. 24, 2012, Network and Parallel Computing; [Lecture Notes in Computer Science; Lect.Notes Computer], Springer International Publishing, Cham, pp. 1-20, XP047335969, ISSN: 0302-9743 ISBN: 978-3-642-36762-5.

Yang et al., "A Case for a Flexible Scalar Unit in SIMT Architecture," 2014 IEEE 28th International Parallel and Distributed Processing Symposium, IEEE, May 19, 2014, pp. 93-102, XP032628968, ISSN: 1530-2075, DOI: 10.1109/IPDPS.2014.21 [retrieved on Aug. 13, 2014].

* cited by examiner

```
void foo(const int *in, int* out)
{
  int idx = get_global_id(0);
  int a = 3;
  int outputData = 0;
  If(a < 5) {
    int value = in[a*10];
    int value2 = in[idx];
    outputdata = value + value2
  }
  out[idx] =outputdata;
}
```

FIG. 2

```
void foo(const int *asrc, const int *in, int* out)
{
  int idx = get_global_id(0);
  int a = asrc[idx];
  int outputData = 0;
  int value;
  if(a < 5) {
    int value = in[a*10];
    int value2 = in[idx];
    outputdata = value + value2
  }
  out[idx] =outputdata;
}
```

FIG. 5

GPU 12

| VECTOR PIPELINE 23A | VECTOR PIPELINE 23B | VECTOR PIPELINE 23N |
|---|---|---|
| ```
void foo(const int *asrc, const int
*in, int* out)
{
  int idx = get_global_id(0);
  int a = asrc[idx];
  int outputData = 0;
  int value;
  if(a < 5) {
    int value = in[a*10];
    int value2 = in[idx];
    outputdata = value + value2
  }
  out[idx] =outputdata;
}
``` | ```
void foo(const int *asrc, const int
*in, int* out)
{
  int idx = get_global_id(0);
  int a = asrc[idx];
  int outputData = 0;
  int value;
  if(a < 5) {
    int value = in[a*10];
    int value2 = in[idx];
    outputdata = value + value2
  }
  out[idx] =outputdata;
}
``` | ```
void foo(const int *asrc, const int
*in, int* out)
{
  int idx = get_global_id(0);
  int a = asrc[idx];
  int outputData = 0;
  int value;
  if(a < 5) {
    int value = in[a*10];
    int value2 = in[idx];
    outputdata = value + value2
  }
  out[idx] =outputdata;
}
``` |

FIG. 6

```
void foo(const int *asrc, const int *in, int* out)
{
    int idx = get_global_id(0);
    int a = asrc[idx];
    int outputData = 0;
    int value;
    if(is_uniform(a)) {
        // Perform all of this code in a scalar unit or on one lane of the vector unit
        scalarA = one of the values of "a" regardless of vector pipeline with which it is associated
        if(scalarA < 5) {
            int valueS = in[scalarA*10];
            value = broadcast(valueS);
        }
    } else {
        if(a < 5) {
            int value = in[a*10];
        }
    }
    if(a<5) {
        int value2 = in[idx];
        outputdata = value + value2
    }
    out[idx] =outputdata;
}
```

FIG. 8

```
void foo(const int *asrc, const int *in, int* out)
{
    int idx = get_global_id(0);
    int a = asrc[idx];
    int outputData = 0;
    int value;
    bool flag = is_uniform(a);
    If((flag ? Scalar{a} : vector{a}) < 5) {
        (flag?scalar{a}:vector{value}) = in[(flag?scalar{a}:vector{a})*10];
        int value2 = in[idx];
        outputdata = (flag?scalar{value}:vector{value}) + value2;
    }
    out[idx] =outputdata;
}
```

FIG. 9

SPECULATIVE SCALARIZATION IN VECTOR PROCESSING

TECHNICAL FIELD

This disclosure relates to vector processing.

BACKGROUND

A processor on a computing device executes object code that is generated from compiling code (i.e., instructions) written in a programming language such as a high level programming language. To generate the object code, a compiler may first compile the code written in the high-level programming language into object code, or into intermediate code (i.e., code in an intermediate language) which itself may be further compiled into object code or directly executed upon. A GPU may receive compiled code in a command stream from a CPU. The compiled code may include compiled vector code. The GPU may be configured to execute the compiled vector code such that a plurality of vector pipelines of the GPU process the compiled vector code.

SUMMARY

In general, this disclosure describes techniques for compiling vector code, and more specifically to techniques for extending the use of a scalar pipeline for speculatively uniform vector code. In examples of the disclosure, a processor may be configured to generate uniformity detection code that when executed during runtime determines whether speculative uniform code at the time of compiling is or is not actually uniform during runtime. The processor may be configured to execute a compiler to generate the uniformity detection code. The processor may be configured to generate scalarized code, which may also be referred to as scalarized vector code, corresponding to the speculatively uniform vector code. The processor may be configured to execute a compiler to generate scalarized code. The compiler may be configured to add the uniformity detection code and scalarized vector code to the code base. For example, the compiler may be configured to add uniformity detection code and scalarized code to any sequence of instructions to be executed. As another example, the compiler may be configured to add uniformity detection code and scalarized code to any code (e.g., a set of instructions). The processor may be configured to execute a compiler to add the uniformity detection code and scalarized vector code to the code base. For example, the processor may be configured to execute a compiler to add the uniformity detection code and scalarized vector code to any sequence of instructions to be executed. As another example, the processor may be configured to execute a compiler to add the uniformity detection code and scalarized vector code to any code (e.g., a set of instructions).

In one example, this disclosure describes a method comprising receiving vector code. In some examples, a first processor may receive the vector code. The vector code may include a plurality of instructions configured to be compiled for execution by a vector processor. The method may include determining, during compilation of the vector code, whether at least one instruction of the plurality of instructions is a speculatively uniform instruction. In some examples, the first processor may determine, during compilation of the vector code, whether at least one instruction of the plurality of instructions is a speculatively uniform instruction. The speculatively uniform instruction may be an instruction that cannot be determined to be a uniform operation during compilation and cannot be determined to not be a uniform operation during compilation. The method may include generating, during compilation of the vector code, uniformity detection code for the at least one speculatively uniform instruction. In some examples, the first processor may generate, during compilation of the vector code, uniformity detection code for the at least one speculatively uniform instruction. The uniformity detection code, when executed, may be configured to determine whether the at least one speculatively uniform instruction is uniform during runtime. The method may include generating, during compilation of the vector code, scalar code by scalarizing the at least one speculatively uniform instruction. In some examples, the first processor may generate, during compilation of the vector code, scalar code by scalarizing the at least one speculatively uniform instruction. The scalar code may be configured to be compiled by the first processor for execution by a scalar processor, a scalar processing unit of the vector processor, or a vector pipeline of the vector processor.

In another example, this disclosure describes a device comprising a memory configured to store vector code, a first processor, and a vector processor. The first processor may be configured to receive vector code from the memory. The vector code may include a plurality of instructions configured to be compiled for execution by a vector processor. The first processor may be configured to determine, during compilation of the vector code, whether at least one instruction of the plurality of instructions is a speculatively uniform instruction. The speculatively uniform instruction may be an instruction that cannot be determined to be a uniform operation during compilation and cannot be determined to not be a uniform operation during compilation. The first processor may be configured to generate, during compilation of the vector code, uniformity detection code for the at least one speculatively uniform instruction. The uniformity detection code, when executed, may be configured to determine whether the at least one speculatively uniform instruction is uniform during runtime. The first processor may be configured to generate, during compilation of the vector code, scalar code by scalarizing the at least one speculatively uniform instruction. The scalar code may be configured to be compiled by the first processor for execution by a scalar processor, a scalar processing unit of the vector processor, or a vector pipeline of the vector processor.

In another example, this disclosure describes an apparatus comprising means for means for receiving vector code. The vector code may include a plurality of instructions configured to be compiled for execution by a vector processor. The apparatus may include means for determining, during compilation of the vector code, whether at least one instruction of the plurality of instructions is a speculatively uniform instruction. The speculatively uniform instruction may be an instruction that cannot be determined to be a uniform operation during compilation and cannot be determined to not be a uniform operation during compilation. The apparatus may include means for generating, during compilation of the vector code, uniformity detection code for the at least one speculatively uniform instruction. The uniformity detection code, when executed, may be configured to determine whether the at least one speculatively uniform instruction is uniform during runtime. The apparatus may include means for generating, during compilation of the vector code, scalar code by scalarizing the at least one speculatively uniform instruction. The scalar code may be configured to be compiled for execution by a scalar processor, a scalar processing unit of the vector processor, or a vector pipeline of the vector processor.

In another example, this disclosure describes a non-transitory computer-readable storage medium having instructions stored thereon that, when executed, cause one or more processors of a computing device to receive vector code. The vector code may include a plurality of instructions configured to be compiled for execution by a vector processor. The instructions, when executed, may cause one or more processors of the computing device to determine, during compilation of the vector code, whether at least one instruction of the plurality of instructions is a speculatively uniform instruction. The speculatively uniform instruction may be an instruction that cannot be determined to be a uniform operation during compilation and cannot be determined to not be a uniform operation during compilation. The instructions, when executed, may cause one or more processors of the computing device to generate, during compilation of the vector code, uniformity detection code for the at least one speculatively uniform instruction. The uniformity detection code, when executed, may be configured to determine whether the at least one speculatively uniform instruction is uniform during runtime. The instructions, when executed, may cause one or more processors of the computing device to generate, during compilation of the vector code, scalar code by scalarizing the at least one speculatively uniform instruction. The scalar code may be configured to be compiled for execution by a scalar processor, a scalar processing unit of the vector processor, or a vector pipeline of the vector processor.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2 is an example of code to illustrate one or more techniques of this disclosure.

FIG. 5 is an example of code including a speculatively uniform operation to illustrate one or more techniques of this disclosure.

FIG. 6 is a conceptual diagram depicting a plurality of vector pipelines of an SIMD architected processing unit executing identical copies of the code depicted in FIG. 5.

FIG. 8 shows one conceptual example of extending the use of a scalar pipeline consistent with the techniques of this disclosure for the example of code shown in FIG. 5.

FIG. 9 depicts one example of a hardware managed version of the implementation shown in FIG. 8.

DETAILED DESCRIPTION

Figure 1A:
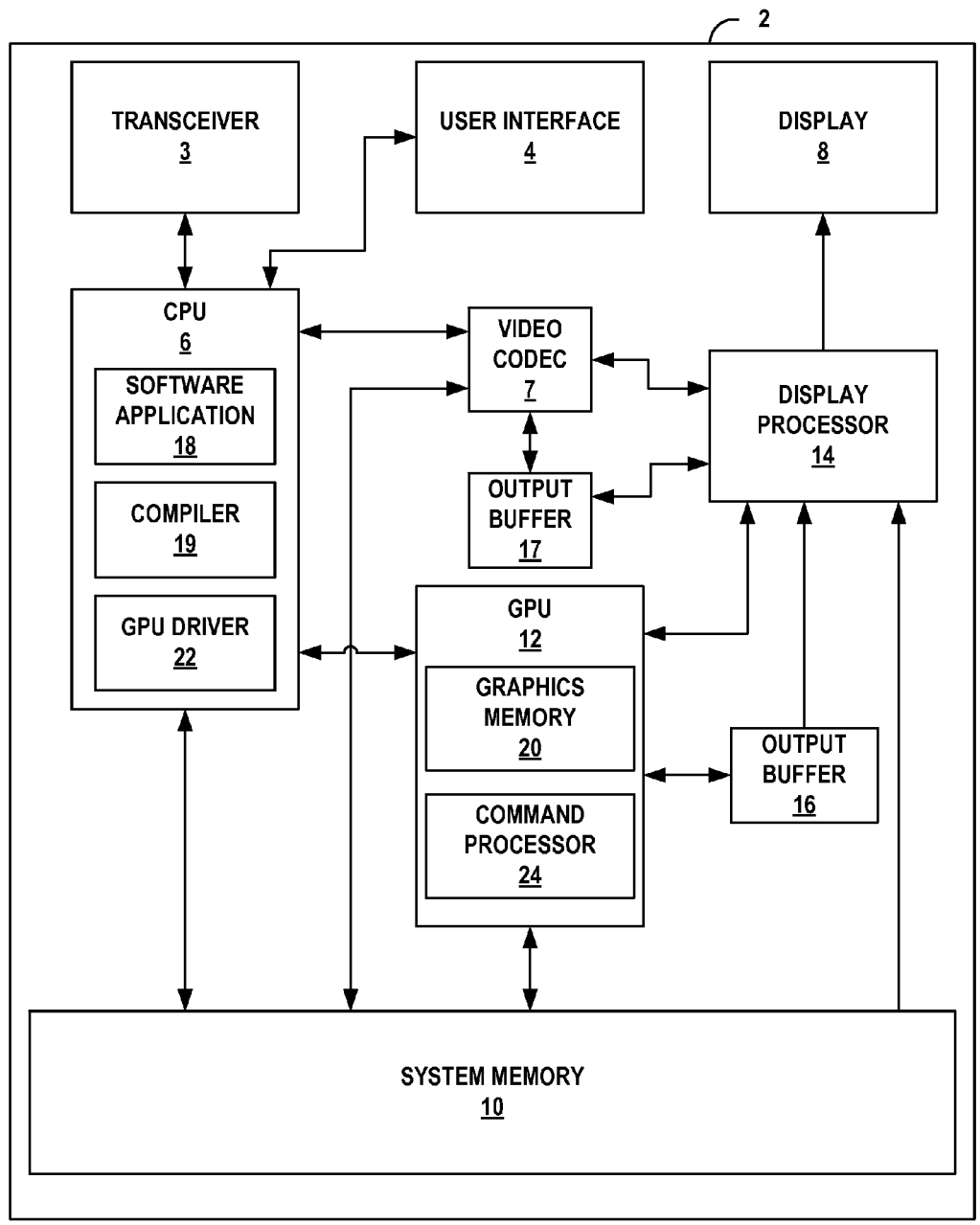
FIG. 1A is a block diagram showing an example computing device configured to use the techniques of this disclosure.

In general, the techniques of this disclosure are directed to extending the use of a scalar pipeline (e.g., a scalar unit within a GPU or a scalar processor unit not integrated with a GPU such as a CPU). More specifically, the techniques of this disclosure are directed to extending the use of a scalar pipeline for one or more instructions that are uniform across a plurality of vector pipelines in a vector processing unit (e.g., a GPU, an array processing unit, and the like) based on a speculative determination. As used herein "speculatively" and "likely" (and any equivalents thereof) are terms to be distinguished with equivocal terms such as "known." For example, speculatively determining whether code is uniform is to be distinguished from determining that code is known to be uniform.

For example, a first instruction setting a first variable equal to a particular integer value would be an example of a known uniformity if such an instruction were to be executed across each vector pipeline. Otherwise stated, there would be no need to engage in speculative determination of whether the first instruction is uniform because the very nature of the first instruction is already informative that the instruction is known to be uniform. But a second instruction setting a second variable equal to a particular integer value based on another variable is an example of an unknown uniformity. For example, at or during runtime, the second variable may be a constant value (and therefore uniform) despite its dependency on another variable. However, in another example, at runtime, the second variable may not be a constant value (and therefore not uniform) due to its dependency on another variable. The techniques of this disclosure may be directed to determining whether speculatively uniform instructions, such as the second instruction in the example above, are in fact uniform and therefore scalarizable based on the speculative determination. It must thus be appreciated that speculatively determining whether code is uniform may result in a determination that certain code is in fact uniform, but that such code is not known to be uniform before the speculative determination. The techniques of this disclosure may be directed to generating uniform code based on speculatively uniform code. The techniques of this disclosure may be directed to generating uniform code based on speculatively uniform code during or at runtime.

In some examples, the techniques of this disclosure may be directed to increasing processing efficiency. For example, Single Program, Multiple Data (SPMD) code compiled for Single Instruction, Multiple Data (SIMD) hardware (e.g., a GPU) may run on each lane of an SIMD architected processing unit (i.e., the same instructions may be executed in parallel on the SIMD architected processing unit). This vector processing can be inefficient for sequences of instructions that are uniform across the vector pipelines of the SIMD architected processing unit. Such uniform instructions may be referred to as uniform code, which may be more efficient to run on a scalar processing unit (e.g., a CPU) or a scalar processing unit integrated with a vector processing unit. While parallelism in processing is often considered advantageous, there are downfalls to parallel processing, such as unnecessary power consumption when processing uniform code on more than one vector pipeline of, for example, an SIMD architected processing unit. The techniques of this disclosure may be directed at removing unnecessary parallelism, which may reduce power consumption. To do so, techniques of this disclosure may include extending the use of a scalar pipeline for one or more instructions that are uniform across a plurality of vector pipelines in a vector processing unit (e.g., a GPU, an array processing unit, and the like) based on a speculative determination of uniformity.

In some examples, a compiler may speculate whether one or more instructions of code are scalarizable during runtime with a runtime check. In such examples, the compiler may generate compiled code for the one or more instructions for a vector pipeline, and may generate and compile scalarized code for a scalar pipeline. Scalarized code may be generated by the compiler performing scalarization on vector code. Scalarization may be considered, in some examples, a process in which scalar code is generated based on corresponding vector code. The resultant scalar code may have the same effect as the corresponding vector code except because it is processed with a scalar pipeline, it is more efficient and opens up clock cycles on the vector pipelines. However, during runtime, only one of the two paths is executed. Otherwise stated, while vector code and corresponding scalarized code may both be compiled, only one of the compiled vector code or the compiled scalarized code is executed during runtime. The techniques of this disclosure utilize a runtime check to determine which version of compiled code is to be executed: the vector code path or the scalarized code path. As one example, if the runtime check results in the determination that the scalarized path is impractical because, for example, the speculatively uniform code is determined to be not uniform at the runtime check, then the compiled vector code may be executed. As another example, if the runtime check results in the determination that the scalarized path is practical because, for example, the speculatively uniform code is determined to be uniform at the runtime check, then the compiled scalarized code may be executed. It should be understood that when the scalarized path is chosen, that does not necessarily mean that no compiled vector code is executed. Rather, non-uniform portions of the code from which the scalarized code was derived is still compiled and executed when the scalarized path is chosen.

In some examples, the runtime check referred to herein may refer to code generated by a compiler that functions as uniformity detection code. When the uniformity detection code is compiled and subsequently executed during runtime, the uniformity detection code is the runtime check that serves as the controller regarding whether the vector path or scalarized path is to be executed. For example, if the uniformity detection code determines during runtime that the code that was considered to be speculatively uniform is in fact uniform during runtime, then the uniformity detection code triggers execution of the scalarized code. However, if the uniformity detection code determines during runtime that the code that was considered to be speculatively uniform is in fact not uniform during runtime, then the uniformity detection code triggers execution of the vector code.

As used herein, the terms "instruction" and "operation" may be used interchangeably. In some examples, as used herein, when an instruction or operation is described as being executed, such a disclosure may refer to executing or interpreting the compiled code corresponding to the instruction or operation. In other examples, as used herein, when an instruction or operation is described as being executed, such a disclosure may refer to causing any effect of the compiled code corresponding to the instruction or operation.

The terms "scalar" and "vector" are used throughout this disclosure. These two terms are commonly understood terms in the field of computer science. For example, a scalar processor may refer to a single instruction, single data (SISD) architected processor. As another example, a vector processor may refer to a multiple instruction, multiple data (MIMD) architected processor. In other examples, a vector processor may refer to a multiple program, multiple data (MPMD) architected processor. In other examples, a vector processor may refer to a single program, multiple data (SPMD) architected processor. A vector processor may be configured to operate on, process, or otherwise run compiled SIMD, MIMD, MPMD, and/or SPMD code. However, it is understood that the terms "scalar" and "vector" may carry different meanings in different contexts. For example, a variable may also be scalar or vector. A scalar variable may refer to a variable that has a single value or that has a value that does not change in value. A scalar variable may be considered a uniform variable due to its uniform, unchanging nature. As another example, a vector variable may refer to a variable that may have a plurality of different values or that has a value that does change in value. A vector variable may not be considered a uniform variable to its non-uniform, changing nature. In some examples, a scalar instruction may be considered a uniform instruction because it operates on scalar data (i.e., uniform data). In some examples, a vector instruction may be considered a uniform instruction (and therefore scalarizable) when it operates on scalar data (i.e., uniform data). In other examples, a scalar instruction may be considered a uniform instruction because it is equivalent to performing the same operation over any number of vector pipelines. In other examples, a vector instruction may be considered uniform, and thus may be converted to a scalar instruction if it performs the same operation over its entire width. Other examples of the meaning of scalar and vector exist but this disclosure is not intended to be a treatise on the meanings of scalar and vector. For example, the term scalar processor is not intended to exclude superpipelined or superscalar processors. Instead, the term scalar processor includes a scalar processor, superpipelined scalar processor, superscalar processor, or any other type of scalar processor. Any processor disclosed herein as being configured to perform one or more techniques described herein may be scalar processor, superpipelined scalar processor, superscalar processor, or any other type of scalar processor.

FIG. 1A is a block diagram illustrating an example computing device that may be configured to implement one or more aspects of this disclosure. As shown in FIG. 1A, computing device 2 may be, for example, a personal computer, a desktop computer, a laptop computer, a tablet computer, a computer workstation, a video game platform or console, a mobile telephone (e.g., a cellular or satellite telephone), a landline telephone, an Internet telephone, a handheld device (e.g., a portable video game device or a personal digital assistant (PDA)), a wearable computing device, a personal music player, a video player, a display device, a television, a television set-top box, a server, an intermediate network device, a mainframe computer, any mobile device, or any other type of device that processes and/or displays graphical data. In the example of FIG. 1A, computing device 2 may include central processing unit (CPU) 6, system memory 10, and graphics processing unit (GPU) 12. CPU 6 may be one example of a scalar processor and have one or more scalar pipelines. For example, each scalar pipeline may correspond to a single core of CPU 6. As another example, one or more scalar pipelines may correspond to one or more cores of CPU 6. As another example, CPU 6 may be a scalar processor, superpipelined scalar processor, superscalar processor, or any other type of scalar processor. Each scalar pipeline in CPU 6 may constitute a scalar arithmetic logic unit (ALU). CPU 6 may be configured to execute scalar code and/or scalarized vector code. GPU 12 may be one example of a vector processor. GPU 12 may be configured to execute vector code, scalar code, and/or scalarized vector code. GPU 12 may include a plurality of vector pipelines. In some examples, GPU 12 may include one or more scalar pipelines. In some examples, GPU 12 may include a scalar processing unit that corresponds to each scalar pipeline. For example, each scalar pipeline of GPU 12, if present, may constitute a scalar ALU.

Computing device 2 may also include display processor 14, transceiver 3, user interface 4, video codec 7, and display 8. In some examples, video codec 7 may be a software application, such as a software application among the one or more software applications 18 configured to be processed by CPU 6 or other components of computing device 2. In other examples, video codec 7 may be a hardware component different from CPU 6, a software application that runs on a component different from CPU 6, or a combination of hardware and software.

In some examples, GPU 12 may be configured in a single instruction, multiple data (SIMD) architecture. In other examples, GPU 12 may be configured in a multiple instruction, multiple data (MIMD) architecture. In some examples, GPU 12 may be configured in a multiple program, multiple data (MPMD) architecture, which may be considered a form of the MIMD architecture. In other examples, GPU 12 may be configured in a single program, multiple data (SPMD) architecture, which may also be considered a form of the MIMD architecture. GPU 12 may be configured to operate on, process, or otherwise run compiled SIMD, MIMD, MPMD, and/or SPMD code. As used herein, the term "vector code" includes SIMD, MIMD, MPMD, and/or SPMD code. For example, GPU 12 may be configured to operate on, process, or otherwise run compiled vector code. The vector code may be written in a graphics API, such as Open Computing Language (OpenCL™), Compute Unified Device Architecture (CUDA), or other graphics API. In some examples, depending on the language used for the vector code and the architecture of GPU 12, GPU 12 may be configured to operate on, process, or otherwise run uncompiled vector code. In this regard, the techniques described herein are not limited to GPU 12. Rather, the techniques described herein apply to any vector processing unit that may be in communication with a scalar processing unit, whether or not the vector processing unit is or is not integrated in the same chip as the scalar processing unit.

Figure 1B:
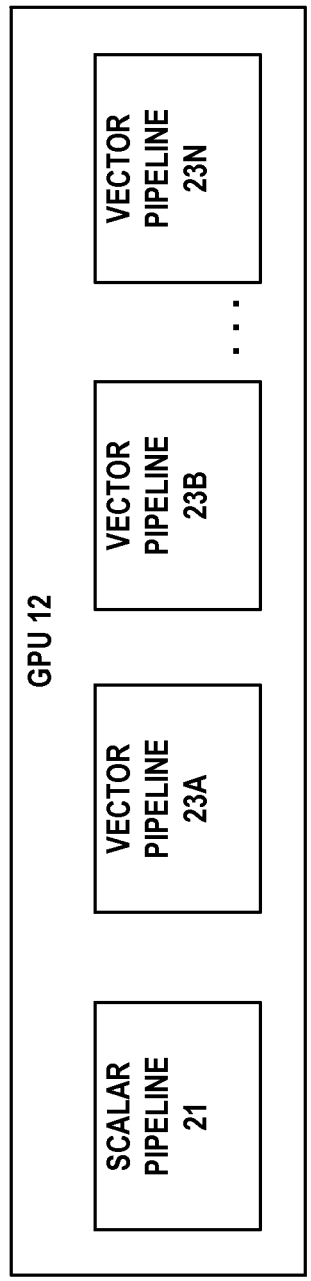
FIG. 1B is a block diagram showing an example graphics processing unit configured to use the techniques of this disclosure.

GPU 12 may include separate scalar and vector pipelines, such as the example of GPU 12 shown in FIG. 1B. For example, GPU 12 may include an SIMD architected processing unit comprising a plurality of vector pipelines, which may also be referred to as vector processing elements, vector paths, vector lanes, processing lanes, and the like. Each vector path may correspond to a vector arithmetic logic unit (ALU). A vector ALU may include one or more scalar ALUs. GPU 12 may include a scalar architected processing unit comprising a scalar pipeline, which may also be referred to as a scalar processing element, scalar path, scalar lane, processing lane, and the like. The scalar path may correspond to a scalar ALU. GPU 12 may include the requisite structure to enable communication between any scalar pipeline(s) and any vector pipeline(s) allowing scalar pipeline(s) and vector pipeline(s) to function in parallel. Enabling parallel execution between a scalar path and a vector path when processing related code may lower the latency of a pair of threads or more than a pair of threads.

As one example and with reference to FIG. 1B, the plurality of vector pipelines may be SIMD architected. In the example of GPU 12 shown in FIG. 1B, GPU 12 includes a plurality of vector pipelines 23A, 23B, and 23N where N represents the Nth vector pipeline. GPU 12 may also include at least one scalar pipeline 21. In other examples, GPU 12 may not include a scalar pipeline.

In examples where GPU 12 includes a SIMD structure, GPU 12 may include a plurality of SIMD processing elements, which may also be referred to as vector processing elements, vector paths, vector lanes, processing lanes, and the like. Each SIMD processing element may execute the same command, but on different data. A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 12 to perform many tasks in parallel (e.g., at the same time).

In some examples, as used herein, the term pipeline may refer to one or more of following: any processing element described herein, any path described herein, any lane described herein, any processing lane described herein, any ALU described herein, and the like. In some examples, as used herein, the term vector pipeline may refer to one or more vector processing elements, one or more vector paths, one or more vector lanes, one or more processing lanes, one or more vector ALUs, and the like. In some examples, as used herein, the term scalar pipeline may refer to one or more scalar processing elements, one or more scalar paths, one or more scalar lanes, one or more processing lanes, one or more scalar ALUs, and the like.

System memory 10 may be a non-transitory storage medium according to some examples. The term "non-transitory" may indicate that the storage medium is not embodied in a carrier wave or a propagated signal. However, the term "non-transitory" should not be interpreted to mean that system memory 10 is non-movable or that its contents are static. As one example, system memory 10 may be removed from computing device 2, and moved to another device. As another example, memory, substantially similar to system memory 10, may be inserted into computing device 2. In certain examples, a non-transitory storage medium may store data that can, over time, change (e.g., in RAM).

While the one or more software applications 18 are conceptually shown as inside CPU 6, it is understood that these one or more software applications 18 may be stored in system memory 10, memory external to but accessible to computing device 2, or a combination thereof. The external memory may, for example, be continuously intermittently accessible to computing device 2.

Display processor 14 may utilize a tile-based architecture. In some examples, a tile is an area representation of pixels comprising a height and width with the height being one or more pixels and the width being one or more pixels. In such examples, tiles may be rectangular or square in nature. In other examples, a tile may be a shape different than a square or a rectangle. Display processor 14 may fetch multiple image layers (e.g., foreground and background) from at least one memory. For example, display processor 14 may fetch image layers from a frame buffer to which a GPU outputs graphical data in the form of pixel representations and/or other memory.

As another example, display processor may 14 may fetch image layers from on-chip memory of video codec 7, on-chip memory of GPU 12, output buffer 16, output buffer 17, and/or system memory 10). The multiple image layers may include foreground layers and/or background layers. As used herein, the term "image" is not intended to mean only a still image. Rather, an image or image layer may be associated with a still image (e.g., the image or image layers when blended may be the image) or a video (e.g., the image or image layers when blended may be a single image in a sequence of images that when viewed in sequence create a moving picture or video).

Display processor 14 may process pixels from multiple layers. Example pixel processing that may be performed by display processor 14 may includes up-sampling, down-sampling, scaling, rotation, and other pixel processing. For example, display processor 14 may process pixels associated with foreground image layers and/or background image layers. Display processor 14 may blend pixels from multiple layers, and write back the blended pixels into memory in tile format. Then, the blended pixels are read from memory in raster format and sent to display 8 for presentment.

Video codec 7 may receive encoded video data. Computing device 2 may receive encoded video data from, for example, a storage medium, a network server, or a source device (e.g., a device that encoded the data or otherwise transmitted the encoded video data to computing device 2, such as a server). In other examples, computing device 2 may itself generate the encoded video data. For example, computing device 2 may include a camera for capturing still images or video. The captured data (e.g., video data) may be encoded by video codec 7. Encoded video data may include a variety of syntax elements generated by a video encoder for use by a video decoder, such as video codec 7, in decoding the video data.

While video codec 7 is described herein as being both a video encoder and video decoder, it is understood that video codec 7 may be a video decoder without encoding functionality in other examples. Video data decoded by video codec 7 may be sent directly to display processor 14, may be sent directly to display 8, or may be sent to memory accessible to display processor 14 or GPU 12 such as system memory 10, output buffer 16, or output buffer 17. In the example shown, video codec 7 is connected to display processor 14, meaning that decoded video data is sent directly to display processor 14 and/or stored in memory accessible to display processor 14. In such an example, display processor 14 may issue one or more memory requests to obtain decoded video data from memory in a similar manner as when issuing one or more memory requests to obtain graphical (still image or video) data from memory (e.g., output buffer 16) associated with GPU 12.

Video codec 7 may operate according to a video compression standard, such as the ITU-T H.264, Advanced Video Coding (AVC), or ITU-T H.265, High Efficiency Video Coding (HEVC), standards. The techniques of this disclosure, however, are not limited to any particular coding standard.

Transceiver 3, video codec 7, and display processor 14 may be part of the same integrated circuit (IC) as CPU 6 and/or GPU 12, may be external to the IC or ICs that include CPU 6 and/or GPU 12, or may be formed in the IC that is external to the IC that includes CPU 6 and/or GPU 12. For example, video codec 7 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof.

Computing device 2 may include additional modules or processing units not shown in FIG. 1A for purposes of clarity. For example, computing device 2 may include a speaker and a microphone, neither of which are shown in FIG. 1A, to effectuate telephonic communications in examples where computing device 2 is a mobile wireless telephone, or a speaker where computing device 2 is a media player. Computing device 2 may also include a camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may be integrated with CPU 6.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications, such as one or more software application 18. The one or more software applications 18 that execute on CPU 6 (or on one or more other components of computing device 2) may include, for example, an operating system, a word processor application, an email application, a spreadsheet application, a media player application, a video game application, a graphical user interface application, or another type of software application that uses graphical data for 2D or 3D graphics.

CPU 6 may be configured to execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

CPU 6 may be configured to execute compiler 19 for compiling code. As used herein, the term "compiler" (e.g., compiler 19) may refer to a software-based compiler, a hardware-based compiler, or a combination thereof. For example, compiler 19 may constitute one of the software applications 18. Compiler 19 may be a runtime compiler, which may also be referred to as a just-in-time compiler. In other examples, compiler 19 may be a non-runtime compiler (e.g., a front end compiler). In yet other examples, one or more functions identified throughout this disclosure may be performed by a compiler executed by CPU 6 (or other scalar processor) and/or GPU 12 (or other vector processor). For example, CPU 6 and/or GPU 12 may be configured to execute a just-in-time compiler. As used throughout this disclosure, a compiler (e.g., compiler 19) performing a function may, according to some examples, be the result of a processor (e.g., a scalar processor or a vector processor) executing the compiler configured in accordance with the techniques of this disclosure.

One or more software applications 18 that execute on, for example, CPU 6 may include one or more graphics rendering instructions that instruct CPU 6 to cause the rendering of graphics data to display 8. The instructions may include instructions to process 3D graphics as well as instructions to process 2D graphics. In some examples, the software instructions may conform to a graphics application programming interface (API). Graphics API may be, for example, an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), a parallel computing platform and API model developed by NVIDIA Corporation such as CUDA (i.e., Compute Unified Device Architecture), or any other public or proprietary standard GPU compute API. In order to process the graphics rendering instructions of one or more software applications 18 executing on CPU 6, CPU 6, during execution of one or more software applications 18, may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

One or more software applications 18 may be any application that utilizes any functionality of GPU 12 or that does not utilize any functionality of GPU 12. For example, one or more applications 18 may be any application where execution by CPU 6 causes (or does not cause) one or more commands to be offloaded to GPU 12 for processing. Examples of one or more applications 18 may include an application that causes CPU 6 to offload 3D rendering commands to GPU 12 (e.g., a video game application), an application that causes CPU 6 to offload 2D rendering commands to GPU 12 (e.g., a user interface application), or an application that causes CPU 6 to offload general compute tasks to GPU 12 (e.g., a GPGPU application). As another example, one or more applications 18 may include firmware resident on any component of computing device 2, such as CPU 6, GPU 12, display processor 14, or any other component. Firmware may or may not utilize or invoke the functionality of GPU 12.

One or more software applications 18 may include one or more drawing instructions that instruct GPU 12 to render a graphical user interface (GUI), a graphics scene, graphical data, or other graphics related data. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

One or more software applications 18 may invoke GPU driver 22, via graphics API, to issue one or more commands to GPU 12 for rendering one or more graphics primitives into displayable graphics images. For example, one or more software applications 18 may invoke GPU driver 22, via graphics API, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered.

GPU 12 may be configured to perform graphics operations to render one or more graphics primitives to display 8. Thus, when one or more software applications 18 executing on CPU 6 requires graphics processing, CPU 6 may provide graphics rendering commands along with graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

One or more software applications 18 may invoke GPU driver 22, to issue one or more commands to GPU 12 for rendering one or more graphics primitives into displayable graphics images (e.g., displayable graphical data). For example, one or more software applications 18 may, when executed, invoke GPU driver 22 to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by one or more software applications 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors of GPU 12 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to output buffer 16 accessible to display processor 14. In some examples, the graphics processing pipeline may include fixed function logic and/or be executed on programmable shader cores.

Output buffer 16 stores destination pixels for GPU 12. Each destination pixel may be associated with a unique screen pixel location. Similarly, output buffer 17 may store destination pixels for video codec 7 depending on the example. Output buffer 17 may be considered a frame buffer associated with video codec 7. In some examples, output buffer 16 and/or output buffer 17 may store color components and a destination alpha value for each destination pixel. For example, output buffer 16 and/or output buffer 17 may store pixel data according to any format. For example, output buffer 16 and/or output buffer 17 may store Red, Green, Blue, Alpha (RGBA) components for each pixel where the "RGB" components correspond to color values and the "A" component corresponds to a destination alpha value. As another example, output buffer 16 and/or output buffer 17 may store pixel data according to the YCbCr color format, YUV color format, RGB color format, or according to any other color format. Although output buffer 16 and system memory 10 are illustrated as being separate memory units, in other examples, output buffer 16 may be part of system memory 10. For example, output buffer 16 may be allocated memory space in system memory 10. Output buffer 16 may constitute a frame buffer. Further, as discussed above, output buffer 16 may also be able to store any suitable data other than pixels.

Similarly, although output buffer 17 and system memory 10 are illustrated as being separate memory units, in other examples, output buffer 17 may be part of system memory 10. For example, output buffer 17 may be allocated memory space in system memory 10. Output buffer 17 may constitute a video codec buffer or a frame buffer. Further, as discussed above, output buffer 17 may also be able to store any suitable data other than pixels. In some examples, although output buffer 16 and output buffer 17 are illustrated as being separate memory units, output buffer 16 and output buffer 17 may be the same buffer or different parts of the same buffer.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC) GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor. In some examples, GPU 12 may be specialized hardware that includes integrated and/or discrete logic circuitry that provides GPU 12 with massive parallel processing capabilities suitable for graphics processing. In some instances, GPU 12 may also include general-purpose processing capabilities, and may be referred to as a general-purpose GPU (GPGPU) when implementing general-purpose processing tasks (e.g., so-called "compute" tasks).

In some examples, graphics memory 20 may be part of GPU 12. For example, graphics memory 20 may be on-chip memory or memory that is physically integrated into the integrated circuit chip of GPU 12. If graphics memory 20 is on-chip, GPU 12 may be able to read values from or write values to graphics memory 20 more quickly than reading values from or writing values to system memory 10 via a system bus. Thus, GPU 12 may read data from and write data to graphics memory 20 without using a bus. In other words, GPU 12 may process data locally using a local storage, instead of off-chip memory. Such graphics memory 20 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 20 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and/or output buffer 16 and output values that cause the pixels of display 8 to illuminate to display the image. In some examples, display processor 14 may be configured to perform 2D operations on data to be displayed, including scaling, rotation, blending, and compositing. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device. In some examples, display 8 may be integrated within computing device 2. For instance, display 8 may be a screen of a mobile telephone. In other examples, display 8 may be a stand-alone device coupled to computer device 2 via a wired or wireless communications link. For example, display 8 may be a computer monitor or flat panel display connected to a computing device (e.g., personal computer, mobile computer, tablet, mobile phone, etc) via a cable or wireless link.

CPU 6 processes instructions for execution within computing device 2. CPU 6 may generate a command stream using a driver (e.g., GPU driver 22 which may be implemented in software executed by CPU 6) for execution by GPU 12. That is, CPU 6 may generate a command stream that defines a set of operations to be performed by GPU 12.

CPU 6 may generate a command stream to be executed by GPU 12 that causes viewable content to be displayed on display 8. For example, CPU 6 may generate a command stream that provides instructions for GPU 12 to render graphics data that may be stored in output buffer 16 for display at display 8. In this example, CPU 6 may generate a command stream that is executed by a graphics rendering pipeline.

Additionally or alternatively, CPU 6 may generate a command stream to be executed by GPU 12 that causes GPU 12 to perform other operations. For example, in some instances, CPU 6 may be a host processor that generates a command stream for using GPU 12 as a general purpose graphics processing unit (GPGPU). In this way, GPU 12 may act as a secondary processor for CPU 6. For example, GPU 12 may carry out a variety of general purpose computing functions traditionally carried out by CPU 6. Examples include a variety of image processing functions, including video decoding and post processing (e.g., deblocking, noise reduction, color correction, and the like) and other application specific image processing functions (e.g., facial detection/recognition, pattern recognition, wavelet transforms, and the like).

In some examples, GPU 12 may collaborate with CPU 6 to execute such GPGPU applications. For example, CPU 6 may offload certain functions to GPU 12 by providing GPU 12 with a command stream for execution by GPU 12. In this example, CPU 6 may be a host processor and GPU 12 may be a secondary processor. CPU 6 may communicate with GPU 12 to direct GPU 12 to execute GPGPU applications via GPU driver 22.

GPU driver 22 may communicate, to GPU 12, one or more command streams that may be executed by shader units of GPU 12. GPU 12 may include command processor 24 that may receive the one or more command streams from GPU driver 22. Command processor 24 may be any combination of hardware and software configured to receive and process one or more command streams. As such, command processor 24 is a stream processor. In some examples, instead of command processor 24, any other suitable stream processor may be usable in place of command processor 24 to receive and process one or more command streams and to perform the techniques disclosed herein. In one example, command processor 24 may be a hardware processor. In the example shown in FIG. 1A, command processor 24 may be included in GPU 12. In other examples, command processor 24 may be a unit that is separate from CPU 6 and GPU 12. Command processor 24 may also be known as a stream processor, command/stream processor, and the like to indicate that it may be any processor configured to receive streams of commands and/or operations.

Command processor 24 may process one or more command streams including scheduling operations included in the one or more command streams for execution by GPU 12. Specifically, command processor 24 may process the one or more command streams and schedule the operations in the one or more command streams for execution by shader units 46. In operation, GPU driver 22 may send to command processor 24 a command stream comprising a series of operations to be executed by GPU 12. Command processor 24 may receive the stream of operations that comprise the command stream and may process the operations of the command stream sequentially based on the order of the operations in the command stream and may schedule the operations in the command stream for execution by shader processors of shader units of GPU 12.

FIG. 2 is an example of code to illustrate one or more techniques of this disclosure. The code depicted in FIG. 2 may constitute OpenCL code, CUDA code, or other SPMD code. Computing device 2 may compile the code depicted in FIG. 2 to run on an SIMD architected processing unit (e.g., GPU 12). In some examples, CPU 6 of computing device 2 may compile the code. In such examples, GPU driver 22 may compile the code. In other examples, the compiler may constitute at least one of the one or more software applications 18, which may be executed by CPU 6 or GPU 12.

Figure 3:
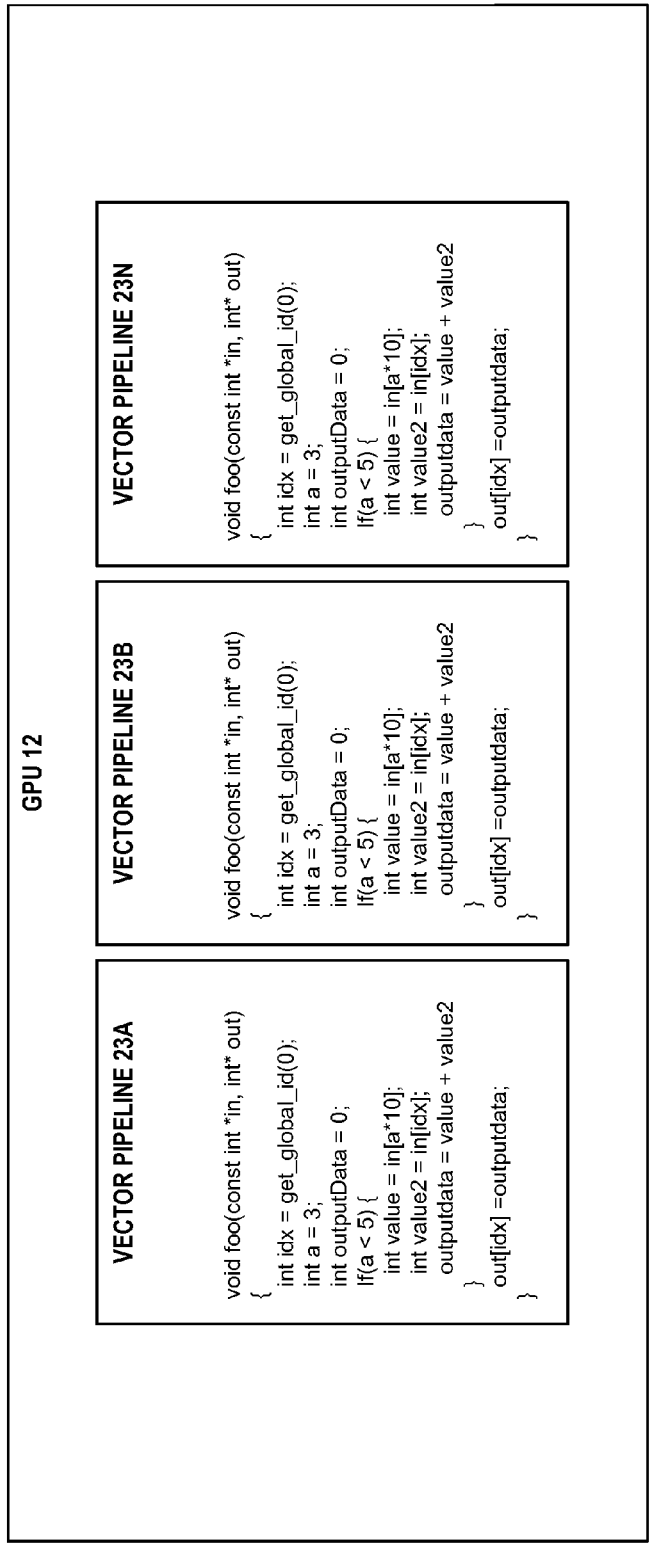
FIG. 3 is a conceptual diagram depicting a plurality of vector pipelines of an SIMD architected processing unit executing identical copies of the code depicted in FIG. 2.
Figure 4:
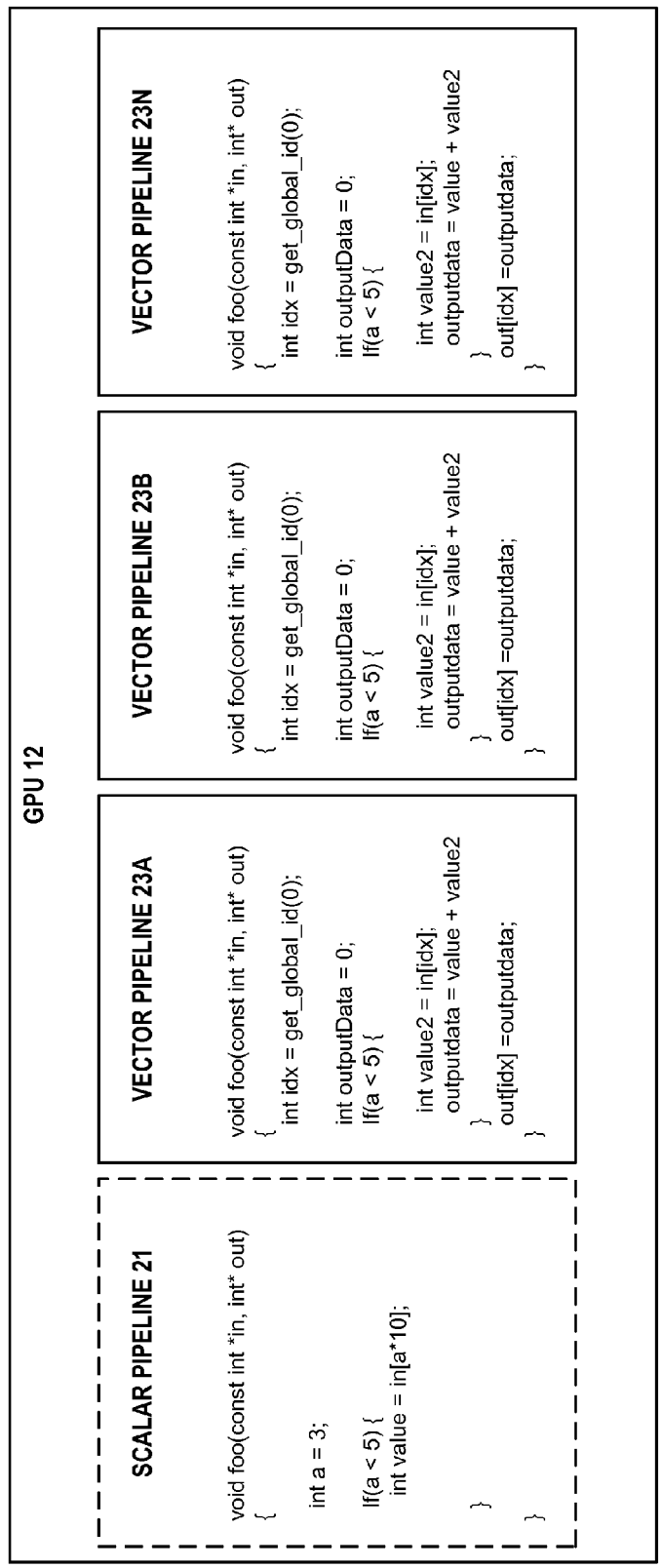
FIG. 4 is a conceptual diagram depicting one example of utilizing a scalar pipeline for uniform operations and a plurality of vector pipelines for non-uniform operations.

The example code depicted in FIG. 2 may be inefficiently run on a plurality of vector pipelines of an SIMD architected processing unit despite certain uniformities amongst the code across each vector pipeline. One example of such inefficient execution is shown in FIG. 3, which conceptually depicts a plurality of vector pipelines 23A, 23B, and 23N (where N represents the Nth vector pipeline) of GPU 12. In this example shown, GPU 12 may be SIMD architected and a plurality of vector pipelines (e.g., 23A-23N) are shown as executing identical copies of the code depicted in FIG. 2. The code depicted in FIGS. 3 and 4 is not shown in compiled form for sake of simplicity and understanding. Such execution may be considered inefficient because of the known uniformities in the code depicted in FIG. 2. Specifically, the compiler may analyze the code resulting in an indication that the variables in, out, a, and value are uniform. Therefore, processing efficiency may be increased by the compiler issuing the known uniform instructions to a scalar pipeline for execution, as conceptually shown in FIG. 4.

FIG. 4 shows one conceptual example of utilizing a scalar pipeline 21 for uniform operations and a plurality of vector pipelines 23A-N for non-uniform operations. In the example of FIG. 4, GPU 12, which may be SIMD architected, is shown as including a scalar pipeline 21. Scalar pipeline 21 may be associated with a scalar ALU or may constitute a scalar ALU. In other examples, instead of or in addition to GPU 12 including a scalar pipeline (such as scalar pipeline 21), GPU 12 may utilize a scalar pipeline on, for example, a CPU (such as CPU 6) or another processing unit that includes a scalar pipeline. In yet other examples, instead of using a scalar pipeline (such as scalar pipeline 21), the example of FIG. 4 may use only one of the vector pipelines as a substitute for the scalar pipeline or a limited number of vector pipelines as substitutes for the scalar pipeline. A processor (e.g., CPU 6) may extract instructions known to be uniform and issue the known uniform instructions for execution by a scalar pipeline of a scalar processor or a vector processor. While the compiler is not shown in FIG. 4, the issued instructions are shown. According to this example, which only depicts known uniform operations and non-uniform operations, a processor of computing device 2 executing a compiler may, for example, issue (or otherwise cause to issue) non-uniform operations and operations that are speculatively uniform to the vector pipelines for execution. In the example shown in FIG. 4, GPU 12 and/or the processing unit on which the scalar pipeline is resident (e.g., GPU 12 or another processing unit such as a CPU 6) may utilize broadcast operations, extract operations, addressable shared registers, or a combination thereof to communicate data between vector pipelines and scalar pipelines.

FIG. 5 is an example of code including a speculatively uniform operation to illustrate one or more techniques of this disclosure. The code depicted in FIG. 5 may constitute OpenCL code, CUDA code, or other SPMD code. Computing device 2 may compile the code depicted in FIG. 5 to run on a vector processing unit (e.g., GPU 12). The vector processing unit may be an SIMD architected processing unit. In some examples, CPU 6 of computing device 2 may compile the code. For example, CPU 6 may be configured to execute compiler 19 to compile the code.

Figure 7:
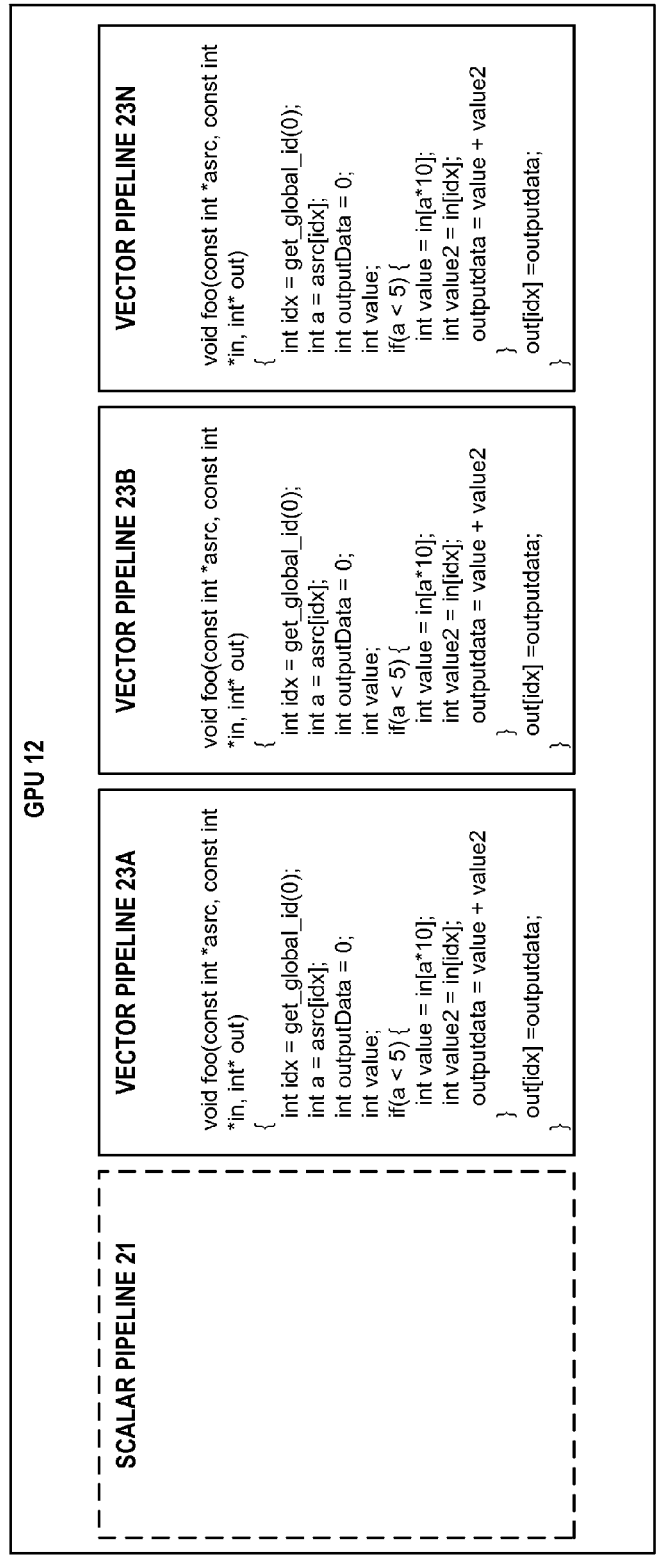
FIG. 7 is a conceptual diagram depicting one example of utilizing a scalar pipeline and a plurality of vector pipelines of an SIMD architected processing unit.

The example code depicted in FIG. 5 may be inefficiently run on a plurality of vector pipelines (e.g., vector pipelines 23A-N) of an SIMD architected vector processing unit (e.g., GPU 12) despite certain uniformities amongst the code across each vector pipeline and despite a possible or speculative uniformity existing. One example of such inefficient execution is shown in FIG. 6, which conceptually depicts a plurality of vector pipelines 23A-23N of GPU 12, which may be SIMD architected, executing identical copies of the code depicted in FIG. 5 across a plurality of vector pipelines 23A-N. The code depicted in FIGS. 6-8 is not shown in compiled form for sake of simplicity and understanding. Such execution may be considered inefficient because of the known uniformities in the code depicted in FIG. 5. Specifically, a processor may analyze the code resulting in an indication that the variables in, out, and value are uniform. Therefore, processing efficiency may be increased by the processor (e.g., CPU 6) issuing the known uniform instructions to a scalar pipeline for execution, as conceptually shown in FIG. 7.

FIG. 7 shows one conceptual example of utilizing a scalar pipeline (such as scalar pipeline 21) for uniform operations (in the example code shown, there are no such operations identifiable at the time of compilation) and a plurality of vector pipelines (such as vector pipelines 23A-23N) for non-uniform operations and a speculatively uniform operation. In the example of FIG. 7, GPU 12 is shown as including scalar pipeline 21. In other examples, instead of or in addition to GPU 12 including scalar pipeline 21, GPU 12 may utilize a scalar pipeline on, for example, CPU 6 or another processing unit that includes a scalar pipeline. A processor (e.g., CPU 6) may extract instructions known to be uniform and issue the known uniform instructions for execution by a scalar pipeline of a scalar processor (e.g., CPU 6) or a vector processor. According to this example, computing device 2 may, via a scalar processor such as CPU 6 executing a compiler for example, issue non-uniform operations and operations that are speculatively uniform to the vector pipelines for execution. However, in the example shown in FIG. 7, processing efficiency is not increased because of the speculative uniformity of the variable a despite other variables being uniform, such as asrc, in, and out. In some examples, the compiler may determine asrc, in, and out are uniform based on any kernel preconditions (e.g., asrc, in, and out may be deemed uniform because that would be a precondition if this example was implemented using an OpenCL kernel).

FIG. 8 shows one conceptual example of extending the use of a scalar pipeline consistent with the techniques of this disclosure for the example of code shown in FIG. 5. For example, the compiler may be configured to determine whether any code is speculatively uniform. In this example, the compiler may determine that the variable a is speculatively uniform. The compiler may generate uniformity detection code. In the example shown in FIG. 8, the uniformity detection code is the function "is_uniform(a)" in the if clause. In this example, the uniformity detection code may be a test across the vector processing unit that checks if each scalar "in" in the vector register storing a value for "a" is identical. In this example, the compiler may be configured to separate a single if statement into a plurality of if statements. For example, the compiler may be configured to generate a first if(a<5) {int value=in[a*10]} and may be configured to generate a second if(a<5) {int value2=in[idx]; outputdata=value+value2} from the if statement depicted in FIG. 5. For example, the compiler may be configured to adjust or modify instructions to separate known uniform operations from operations known from non-uniform operations and/or to separate speculatively uniform operations from non-uniform operations.

The compiler, as shown, injects or otherwise modifies the analyzed code to include the generated uniformity detection code. Additionally, as shown in this example, the compiler injects or other modifies the code to include a scalarized version of the speculative uniform code. Upon compilation, the compiler compiles, among other code, the uniformity detection code, the scalarized code, and the vector code. However, due to the nature of the conditional if-else code, only one of the following is executed during runtime: the compiled scalarized code or the compiled vector code.

For example, if the uniformity detection code returns as true during runtime meaning that the speculatively uniform code is actually uniform during runtime, then the scalarized version of "if(a<5){int value=in[a*10];}" is executed. The scalarized version of such code is shown in the code between the "if(is_uniform(a))" condition and the else condition in FIG. 8. Explained further, the scalarized code may be executed using one or more scalar registers (e.g., one or more scalar general purpose registers), perform a load dependent on a scalar, and then broadcast the value back across the vector. If however, the uniformity detection code returns as false during runtime meaning that the speculatively uniform code is actually non-uniform, then the non-scalarized version of "if(a<5) {int value=in[a*10];} is executed as shown in the code following the else condition.

FIG. 9 depicts one example of a hardware managed version of the implementation shown in FIG. 8. For example, the same register index from scalar and vector sets may be allocated by the compiler. A sequence of instructions off of a bit in an execution control register may be flagged. In this example, such a bit is the Boolean flag. For example, if the flag (e.g., a scalar/vector flag) is 1, the scalar register file may be indexed and treated as scalar. As another example, if the flag is 0, the vector register file may be indexed and treated as vector. In the example shown, execution of the uniformity detection code results in the flag being set to 0 or 1. Therefore, similar to the implementation example depicted in FIG. 8, the hardware managed version also includes a scalar and vector path, but only one path is followed during execution. For example, as further explained, the compiler may be configured to allocate the same register from scalar and vector sets, and hardware of a processing unit may run the same instruction either in the scalar path or the vector path depending on the value of the scalar/vector flag. For example, if an instruction is interpreted as a scalar, then the instruction may be read from the scalar register because that is what a scalar pipe may be configured to process. As another example, if an instruction is interpreted as a vector, then the instruction may be read from the vector register because that is what a vector pipe may be configured to process. In some examples, managing one or more techniques described herein via hardware, such as that described above, may enable the same instruction sequence to be used but interpreted differently depending on the hardware flag without having to increase the amount of code in the program.

In some examples, a compiler heuristic may be applied to determine whether to have the compiler generate uniformity detection code and scalarized vector code. For example, the compiler may be configured to generate uniformity detection code in response one or more of the following heuristics: (1) if the complexity of the vector operations is small, the cost of the additional control flow may not be justified, (2) if the probability of uniformity is low, the runtime cost of the checks may not be justified, and (3) if the code size expansion is significant, the hit on the code cache may be problematic. In cases where the balance is right, the saving on memory traffic by taking the scalar path instead of the vector path will frequently justify the additional code generation. This is especially true in the extreme case of code that is always uniform at runtime, and hence can take the scalar path, but where this is not detectable at compile time so a conservative compiler will have to assume vector execution resulting in less efficient code processing.

Figure 10:
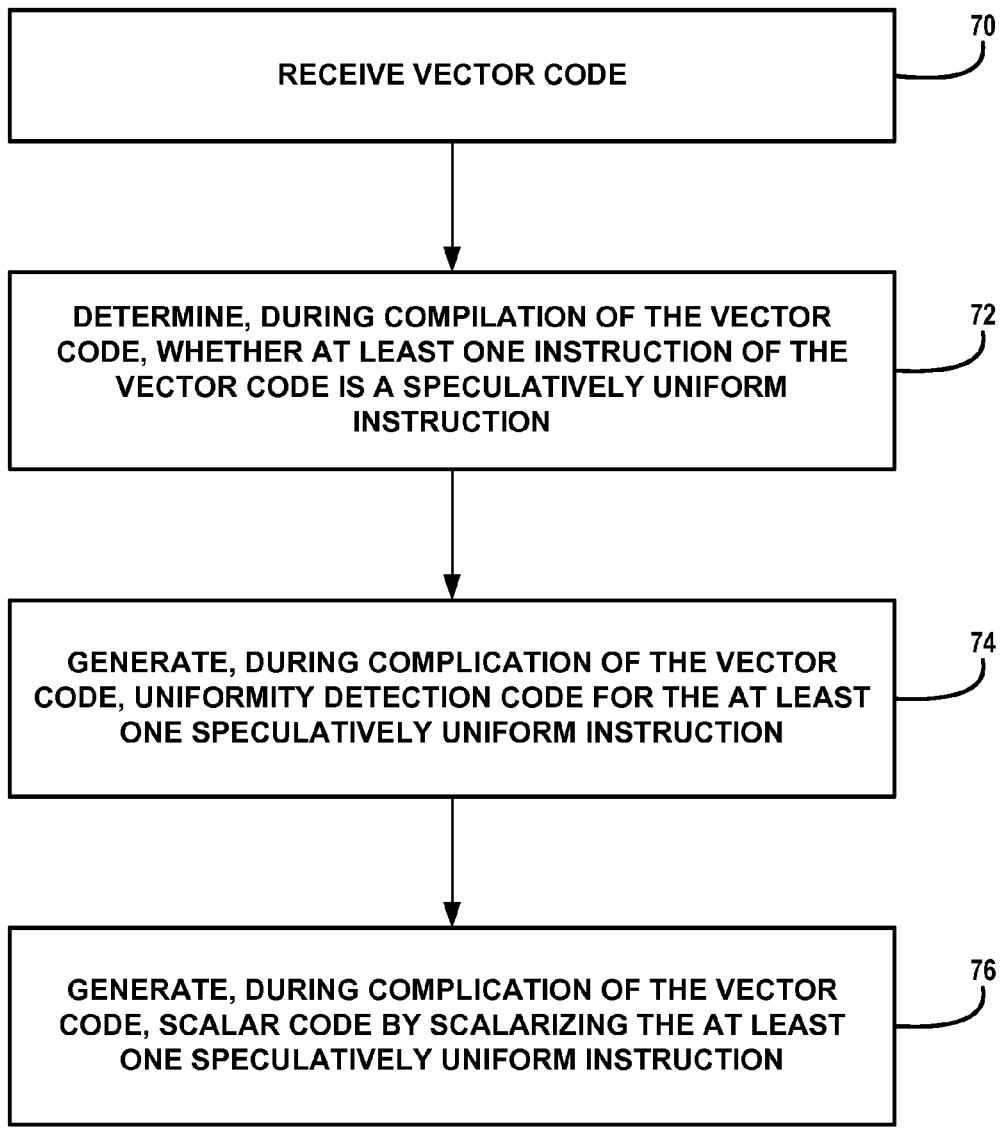
FIG. 10 is a flowchart showing an example method of the disclosure.

FIG. 10 is a flowchart showing an example method of the disclosure. The method of FIG. 10 may be carried out by CPU 6, GPU 12, one or more processors, or a combination thereof. In some examples, the method of FIG. 10 may be carried out by execution of a compiler by CPU 6, GPU 12, one or more processors, or a combination thereof. FIG. 10 depicts a method consistent with one or more techniques of this disclosure.

A first processor may be configured to receive vector code (70). In some examples, the first processor may be a scalar processor (e.g., CPU 6). In other examples, the first processor may be a vector processor (e.g., GPU 12) that includes a scalar processor or one or more scalar processing units. In such examples, the vector processor may be configured to receive the vector code and perform one or more of the functions described throughout this disclosure.

The first processor may be configured to receive the vector code from a memory accessible to the first processor, such as system memory 10. The vector code may include a plurality of instructions configured to be compiled for execution by a vector processor. In some examples, the vector code is single program, multiple data (SPMD) code.

In some examples, the vector processor may be a single instruction, multiple data (SIMD) architected graphics processing unit (GPU) and the vector code may be single program, multiple data (SPMD) code. In some examples, the vector processor may be a graphics processing unit (GPU) (e.g, GPU 12). In some examples, the first processor may be a central processing unit (CPU). In other examples, the first processor and the vector processor may be the same processor configured to perform scalar processing and vector processing. In other examples, the first processor and the vector processor may be different processors. For example, the first processor may be a CPU (e.g., CPU 6) and the vector processor may be a GPU (e.g., GPU 12).

The first processor may be configured to determine, during compilation of the vector code, whether at least one instruction of the plurality of instructions is a speculatively uniform instruction (72). In some examples, the speculatively uniform instruction is an instruction that cannot be determined to be a uniform operation during compilation and cannot be determined to not be a uniform operation during compilation. The processor may be configured to generate, during compilation of the vector code, uniformity detection code for the at least one speculatively uniform instruction (74). In some examples, the uniformity detection code, when executed, is configured to determine whether the at least one speculatively uniform instruction is uniform during runtime. The uniformity detection code may be generated by the first processor and executed by the same processor during runtime. In other examples, the uniformity detection code may be generated by the first processor (e.g., CPU 6) and executed by the vector processor (e.g., GPU 12) during runtime.

The first processor may be configured to generate, during compilation of the vector code, scalar code by scalarizing the at least one speculatively uniform instruction (76). In some examples, the scalar code is configured to be compiled by the first processor (e.g., CPU 6) for execution by a scalar processor (e.g., the first processor or CPU 6), a scalar processing unit of the vector processor (e.g., GPU 12), or a vector pipeline of the vector processor (e.g., GPU 12). In some examples, the scalar processor and the first processor refer to the same processor configured to perform scalar processing. In other examples, the vector processor, the first processor, and the scalar processor refer to the same processor configured to perform vector processing and/or scalar processing. In other examples, the vector processor, the first processor, and the scalar processor may refer to separately distinct processors, or separately distinct processing units integrated in the same processor.

As used herein, a scalar processing unit of the vector processor may refer to a scalar pipeline of the vector processor. Similarly, as used herein, a vector pipeline may refer to a vector processing unit of the vector processor. A scalar processing unit may include a scalar ALU whereas a vector processing unit may include one or more a vector ALUs. A vector ALU may include one or more scalar ALUs.

In some examples, the first processor may be configured to modify, during compilation of the vector code, the vector code to include the generated uniformity detection code and the generated scalar code. In some examples, the first processor or the vector processor may be configured to execute the generated uniformity detection code during runtime to determine whether the at least one speculatively uniform instruction is uniform during runtime.

In some examples, the first processor, the vector processor, a scalar pipeline of the vector processor, or one or more vector pipelines of the vector processor may be configured to execute the generated scalar code if the at least one speculatively uniform instruction is determined to be uniform during runtime based on execution of the generated uniformity detection code.

In some examples, the first processor, the vector processor, a scalar pipeline of the vector processor, or one or more vector pipelines of the vector processor may be configured to not execute the generated scalar code if the at least one speculatively uniform instruction is determined not to be uniform during runtime based on execution of the generated uniformity detection code.

In some examples, the first processor, the vector processor, a scalar pipeline of the vector processor, or one or more vector pipelines of the vector processor may be configured to execute the at least one speculatively uniform instruction by a plurality of vector pipelines of the vector processor, such as a plurality of vector pipelines of GPU 12.

Figure 11:
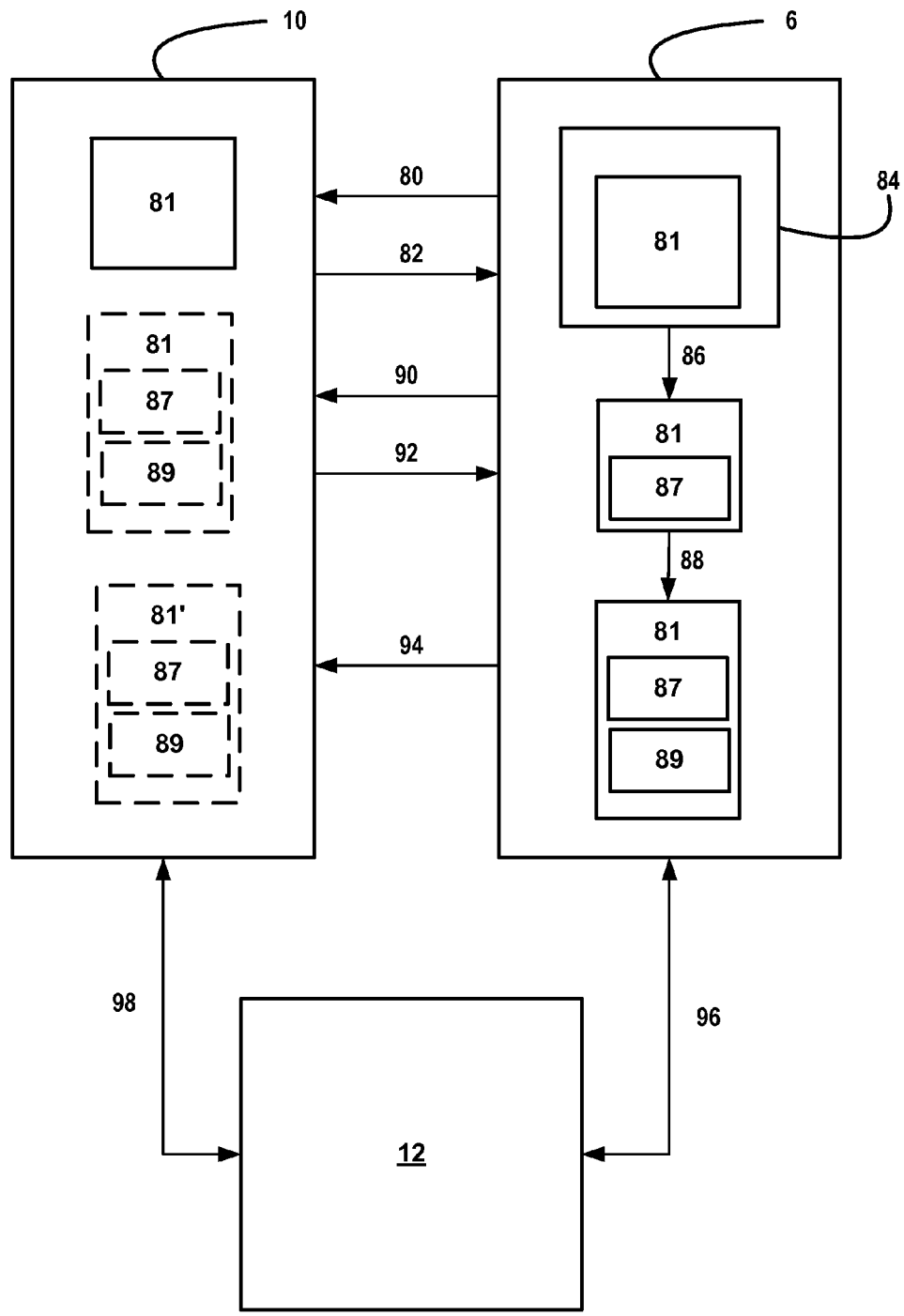
FIG. 11 is a flowchart showing an example method of the disclosure.

FIG. 11 is a flowchart showing an example method of the disclosure. CPU 6 is configured to request vector code from system memory 10 (80). In response to the request, CPU 6 is configured to receive vector code 81 from system memory 10 (82). The vector code may include a plurality of instructions configured to be compiled for execution by a vector processor, such as GPU 12. CPU 6 may analyze the vector code to determine whether at least one instruction of the plurality of instructions is a speculatively uniform instruction (84). In some examples, CPU 6 may be configured to execute compiler 19 to analyze the vector code to determine whether at least one instruction of the plurality of instructions is a speculatively uniform instruction. CPU 6 may be configured to generate uniformity detection code 87 for the at least one speculatively uniform instruction and modify the vector code 81 to include the uniformity detection code 87 (86). In some examples, CPU 6 may be configured to execute compiler 19 to generate uniformity detection code 87 for the at least one speculatively uniform instruction and modify the vector code 81 to include the uniformity detection code 87. CPU 6 may be configured to generate scalar code 89 by scalarizing the at least one speculatively uniform instruction and modify the vector code 81 to include the scalar code 89 (88). In some examples, CPU 6 may be configured to execute compiler 19 to generate scalar code 89 by scalarizing the at least one speculatively uniform instruction and modify the vector code 81 to include the scalar code 89.

In some examples, CPU 6 may be configured to write modified vector code 81 that includes uniformity detection code 87 and scalar code 89 to system memory 10 (90). CPU 6 may be configured to retrieve the modified vector code 81 that includes uniformity detection code 87 and scalar code 89 from system memory 10 (92) to compile the code for execution resulting in compiled modified vector code 81'. CPU 6 may be configured to write compiled modified vector code 81' to system memory 10 (94).

In other examples, CPU 6 may be configured to compile modified vector code 81 that includes uniformity detection code 87 and scalar code 89 resulting in compiled modified code 81' without first storing the modified vector code in system memory 10. In such examples, CPU 6 may be configured to write compiled modified vector code 81' to system memory 10 (94).

In some examples, CPU 6 may be configured to send the compiled modified vector code 81' to the GPU for execution (96). In other examples, GPU 12 may be configured to retrieve the compiled modified vector code 81' from system memory 10 (98).

GPU 12 may be configured to execute the compiled modified vector code 81'. In some examples, during runtime of the compiled modified vector code 81' (or just-in-time compiled modified vector code in the example where a just-in-time compiler is utilized), GPU 12 may be configured to execute compiled uniformity detection code 87 to determine whether the at least one speculatively uniform instruction is uniform during runtime. GPU 12 may be configured to execute compiled scalar code 89 if the at least one speculatively uniform instruction is determined to be uniform during runtime based on execution of the compiled uniformity detection code 87. GPU 12 may be configured to not execute compiled scalar code 89 if the at least one speculatively uniform instruction is determined not to be uniform during runtime based on execution of compiled uniformity detection code 87. GPU 12 may be configured to execute the at least one speculatively uniform instruction by a plurality of vector pipelines if the at least one speculatively uniform instruction is determined not to be uniform during runtime based on execution of compiled uniformity detection code 87.

In some examples, CPU 6 may not compile the modified vector code 81 before sending it to GPU 12 for execution. Instead, for example, GPU 12 may utilize a just-in-time compiler to compile and execute any modified vector code 81 received from CPU 6.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. As another example, any processing unit described herein may be configured to perform any function described herein. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "processing unit" as used herein may refer to any of the foregoing structure or any other structure suitable for implementation of the techniques described herein. In addition, in some aspects, the functionality described herein may be provided within dedicated hardware and/or software modules configured for compiling vector code, compiling scalar code, compiling vector and scalar code, parallel processing, scalar processing, parallel and scalar processing, scalarization, speculative scalaration, etc. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

receiving, by a first processor, vector code, wherein the vector code includes a plurality of instructions configured to be compiled for execution by a vector processor;

determining, by the first processor during compilation of the vector code, whether at least one instruction of the plurality of instructions is a speculatively uniform instruction, wherein the speculatively uniform instruction is an instruction that cannot be determined to be a uniform operation during compilation and cannot be determined to not be a uniform operation during compilation;

generating, by the first processor during compilation of the vector code, uniformity detection code for the at least one speculatively uniform instruction, wherein the uniformity detection code, when executed, is configured to determine whether the at least one speculatively uniform instruction is uniform during runtime;

generating, by the first processor during compilation of the vector code, scalar code by scalarizing the at least one speculatively uniform instruction, wherein the scalar code is configured to be compiled by the first processor for execution by a scalar processor, a scalar processing unit of the vector processor, or a vector pipeline of the vector processor; and executing, by the vector processor, the generated uniformity detection code during runtime to determine whether the at least one speculatively uniform instruction is uniform during runtime.

2. The method of claim 1, further comprising modifying, by the first processor during compilation of the vector code, the vector code to include the generated uniformity detection code and the generated scalar code.

3. The method of claim 1, wherein the vector processor is a graphics processing unit (GPU) and the first processor is a central processing unit (CPU), or wherein the vector processor is a GPU and the scalar processor is the first processor, or wherein the vector processor, the first processor, and the scalar processor are the same processor configured to perform vector processing and scalar processing.

4. The method of claim 1, wherein the vector code is single program, multiple data (SPMD) code.

5. The method of claim 1, wherein the vector processor is a single instruction, multiple data (SIMD) architected graphics processing unit (GPU) and the vector code is single program, multiple data (SPMD) code.

6. The method of claim 1, further comprising executing, by the scalar processing unit of the vector processor or the vector pipeline of the vector processor, the generated scalar code if the at least one speculatively uniform instruction is determined to be uniform during runtime based on execution of the generated uniformity detection code.

7. The method of claim 1, further comprising not executing the generated scalar code if the at least one speculatively uniform instruction is determined not to be uniform during runtime based on execution of the generated uniformity detection code.

8. The method of claim 1, further comprising executing the at least one speculatively uniform instruction by a plurality of vector pipelines of the vector processor.

9. A device comprising:
a memory configured to store vector code;
a first processor; and
a vector processor, wherein the first processor is configured to:
receive vector code from the memory, wherein the vector code includes a plurality of instructions configured to be compiled for execution by a vector processor;
determine, during compilation of the vector code, whether at least one instruction of the plurality of instructions is a speculatively uniform instruction, wherein the speculatively uniform instruction is an instruction that cannot be determined to be a uniform operation during compilation and cannot be determined to not be a uniform operation during compilation;
generate, during compilation of the vector code, uniformity detection code for the at least one speculatively uniform instruction, wherein the uniformity detection code, when executed, is configured to determine whether the at least one speculatively uniform instruction is uniform during runtime; and
generate, during compilation of the vector code, scalar code by scalarizing the at least one speculatively uniform instruction, wherein the scalar code is configured to be compiled by the first processor for execution by a scalar processor, a scalar processing unit of the vector processor, or a vector pipeline of the vector processor, wherein the vector processor is configured to execute the generated uniformity detection code during runtime to determine whether the at least one speculatively uniform instruction is uniform during runtime.

10. The device of claim 9, wherein the first processor is further configured to modify, during compilation of the vector code, the vector code to include the generated uniformity detection code and the generated scalar code.

11. The device of claim 9, wherein the vector processor is a graphics processing unit (GPU) and the first processor is a central processing unit (CPU), or wherein the vector processor is a GPU and the scalar processor is the first processor, or wherein the vector processor, the first processor, and the scalar processor are the same processor configured to perform vector processing and scalar processing.

12. The device of claim 9, wherein the vector code is single program, multiple data (SPMD) code.

13. The device of claim 9, wherein the vector processor is a single instruction, multiple data (SIMD) architected graphics processing unit (GPU) and the vector code is single program, multiple data (SPMD) code.

14. The device of claim 9, wherein the scalar processing unit of the vector processor or the vector pipeline of the vector processor is configured to execute the generated scalar code if the at least one speculatively uniform instruction is determined to be uniform during runtime based on execution of the generated uniformity detection code.

15. The device of claim 9, wherein the vector processor is configured to not execute the generated scalar code if the at least one speculatively uniform instruction is determined not to be uniform during runtime based on execution of the generated uniformity detection code.

16. The device of claim 9, wherein a plurality of vector pipelines of the vector processor are configured to execute the at least one speculatively uniform instruction.

17. An apparatus comprising:
means for receiving vector code, wherein the vector code includes a plurality of instructions configured to be compiled for execution by a vector processor;
means for determining, during compilation of the vector code, whether at least one instruction of the plurality of instructions is a speculatively uniform instruction, wherein the speculatively uniform instruction is an instruction that cannot be determined to be a uniform operation during compilation and cannot be determined to not be a uniform operation during compilation;
means for generating, during compilation of the vector code, uniformity detection code for the at least one speculatively uniform instruction, wherein the uniformity detection code, when executed, is configured to determine whether the at least one speculatively uniform instruction is uniform during runtime;
means for generating, during compilation of the vector code, scalar code by scalarizing the at least one speculatively uniform instruction, wherein the scalar code is configured to be compiled for execution by a scalar processor, a scalar processing unit of the vector processor, or a vector pipeline of the vector processor; and
means for executing the generated uniformity detection code during runtime to determine whether the at least one speculatively uniform instruction is uniform during runtime.

18. The apparatus of claim 17, further comprising means for modifying, during compilation of the vector code, the vector code to include the generated uniformity detection code and the generated scalar code.

19. The apparatus of claim 17, wherein the vector processor is a graphics processing unit (GPU) and the scalar processor is a central processing unit (CPU), or wherein the vector processor and the scalar processor are the same processor configured to perform vector processing and scalar processing.

20. The apparatus of claim 17, wherein the vector code is single program, multiple data (SPMD) code.

21. The apparatus of claim 17, wherein the vector processor is a single instruction, multiple data (SIMD) architected graphics processing unit (GPU) and the vector code is single program, multiple data (SPMD) code.

22. The apparatus of claim 17, further comprising means for executing the generated scalar code if the at least one speculatively uniform instruction is determined to be uniform during runtime based on execution of the generated uniformity detection code.

23. The apparatus of claim 17, further comprising means for not executing the generated scalar code if the at least one speculatively uniform instruction is determined not to be uniform during runtime based on execution of the generated uniformity detection code.

24. The apparatus of claim 17, further comprising means for executing the at least one speculatively uniform instruction.

25. A non-transitory computer-readable storage medium having instructions stored thereon that, when executed, cause one or more processors of a computing device to:
receive vector code, wherein the vector code includes a plurality of instructions configured to be compiled for execution by a vector processor;
determine, during compilation of the vector code, whether at least one instruction of the plurality of instructions is a speculatively uniform instruction, wherein the speculatively uniform instruction is an instruction that cannot be determined to be a uniform operation during compilation and cannot be determined to not be a uniform operation during compilation;
generate, during compilation of the vector code, uniformity detection code for the at least one speculatively uniform instruction, wherein the uniformity detection code, when executed, is configured to determine whether the at least one speculatively uniform instruction is uniform during runtime; and
generate, during compilation of the vector code, scalar code by scalarizing the at least one speculatively uniform instruction, wherein the scalar code is configured to be compiled for execution by a scalar processor, a scalar processing unit of the vector processor, or a vector pipeline of the vector processor, wherein the instructions, when executed, further cause one or more processors of the computing device to cause the vector processor to execute the generated uniformity detection code during runtime to determine whether the at least one speculatively uniform instruction is uniform during runtime.

26. The non-transitory computer-readable storage medium of claim 25, wherein the instructions, when executed, further cause one or more processors of the computing device to cause the vector processor to:
execute the generated scalar code if the at least one speculatively uniform instruction is determined to be uniform during runtime based on execution of the generated uniformity detection code.

27. The non-transitory computer-readable storage medium of claim 25, wherein the instructions, when executed, further cause one or more processors of the computing device to cause the vector processor to:
not execute the generated scalar code if the at least one speculatively uniform instruction is determined not to be uniform during runtime based on execution of the generated uniformity detection code.

* * * * *